United States Patent
Nemoto

[11] Patent Number: 6,039,402
[45] Date of Patent: Mar. 21, 2000

[54] SEAT PROVIDED WITH A SEAT CLIMBING/ DESCENDING AID STRUCTURE FOR EASY CLIMBING ONTO AND DESCENDING FROM THE SEAT, AND A SEAT CLIMBING/ DESCENDING AID DESIGNED FOR THAT PURPOSE

[75] Inventor: Akira Nemoto, Akishima, Japan

[73] Assignee: Tachi-S Co., Ltd., Tokyo, Japan

[21] Appl. No.: 09/248,984

[22] Filed: Feb. 12, 1999

[51] Int. Cl.$^7$ .................................................... B60N 2/02
[52] U.S. Cl. ............................... 297/411.34; 297/284.9; 296/65.05
[58] Field of Search .................. 297/284.9, 337, 297/411.34; 5/81.1 R, 81.1 HS, 185, 430; 296/65.01, 65.05

[56] References Cited

U.S. PATENT DOCUMENTS

| | | | |
|---|---|---|---|
| 5,040,832 | 8/1991 | Zalewski | 296/65.1 |
| 5,435,614 | 7/1995 | Nordberg | 296/65.01 X |
| 5,690,381 | 11/1997 | Hasegawa et al. | 297/411.34 X |

FOREIGN PATENT DOCUMENTS

| | | | |
|---|---|---|---|
| 229831 | 11/1985 | Japan | 297/284.9 |
| 626595 | 4/1994 | Japan | |
| 79641 | 2/1995 | Japan | |
| 731457 | 6/1995 | Japan | |
| 9202164 | 8/1997 | Japan | |
| 1086706 | 4/1998 | Japan | |

*Primary Examiner*—Peter R. Brown
*Attorney, Agent, or Firm*—Browdy and Neimark

[57] ABSTRACT

A seat provided with a seat climbing/descending aid structure, which allows a driver, passenger or physically handicapped person to easily climb onto and descend from the seat. The seat is formed by a seat cushion body forming a seat cushion, and a movable side support member disposed at a side where the driver, passenger or physically handicapped person climbs onto and descends from the seat. The movable side support member are provided separately from the seat cushion body, but arranged therewith in the seat in a manner rotatable to a horizontal use position where its cushion surface is placed on a generally horizontal plane. The seat cushion body is so rotatable as to lower its forward end portion to thereby set the seating surface thereof generally on the same horizontal plane with and generally in registry with the cushion surface of movable side support member set in the horizontal use position, hence allowing the easy climbing and descending of the driver, passenger or physically handicapped person onto and from the seat.

7 Claims, 4 Drawing Sheets

SEAT PROVIDED WITH A SEAT CLIMBING/ DESCENDING AID STRUCTURE FOR EASY CLIMBING ONTO AND DESCENDING FROM THE SEAT, AND A SEAT CLIMBING/ DESCENDING AID DESIGNED FOR THAT PURPOSE

BACKGROUND OF INVENTION

1. Field of the Invention

The present invention relates to a seat for use with vehicle and automobile, and is particularly directed to a seat provided with a seat climbing/descending aid structure and a seat climbing/descending aid for that purpose, which allows a physically handicapped person, such as an aged or disable person, to easily climb onto and descend from a seat of the vehicle.

2. Description of Prior Art

A vehicle or automotive seat has a seat cushion providing a seating basis on which a driver or passenger can sit at the buttocks. Some of the seats employ a seat cushion of the kind which has a backwardly inclined seating area (see (12) in FIG. 4, for example) and is provided with a pair of upstanding side support members (see (12—12) in FIG. 1). This sort of seat is what is called a "bucket-type seat" with a backwardly lowered or inclined seating surface, and has been employed in many of vehicle seats. For, a driver or passenger feels comfortable within the seat, with his or her buttocks part seated and supported deeply in that backwardly inclined area of seat cushion. Also, the two upstanding side supports insure holding the driver or passenger from both sides to avoid lateral unpleasant movement of his or her hip and thigh portions relative to the seat.

Normally, in the action of climbing onto and descending from the seat in vehicle, an occupant on the seat has to first take his or her legs out of the vehicle via the opened door, then leave the body laterally therefrom in a bowed posture, and finally stand up.

In the seat of vehicle or automobile, as an occupant descends therefrom via a door space at one of both lateral sides of vehicle (or automobile) body, both outer lateral sides of the vehicle body, which lie in the width-wise direction of the body, are defined as "seat climbing/ descending sides" with respect to the seat. The occupant, driver or passenger normally climbs onto or descends from the seat via one of such seat climbing/descending sides and door space of the vehicle.

However, in the case of the foregoing seat having the backwardly inclined or lowered seat cushion, an occupant on the seat feels it difficult to take a rapid descending action from the lowered seating surface of seat cushion. Particularly, as many of known seats employ the so-called "bucket-type" seat cushion having two upstanding side support members, the occupant on the seat is prevented by those side support members from taking out his or her legs from the seat, when getting off the vehicle or automobile. Also, the occupant is kept seated deeply in the lowered area of seat cushion. As a result, the occupant can not easily change his or her posture to descend from the seat, and can not take a balanced posture and action to smoothly descend from the seat, neither. In that case, an ordinary person of ordinary age and physical strength can overcome those difficulties by using his or her ordinary arm strength and flexible physique. But, this may be impossible for an aged or disable person with less physical strength. That is, even an improved seat of this kind, having the above-stated good support and seating depth, is of a high likelihood that an adverse effect will be given to the physically handicapped person.

Further, such bucket-type seat with the backwardly inclined or lowered seat-cushion seating surface is not suited particularly for a lower-part handicapped person having any defect in his or her lower half of body and thus having any other actions than to move his or her buttocks and thigh portions horizontally and laterally in relation to the seat. Apparently, the two side supports and uneven seating surface of this seat results in hindering such one-directional movement of handicapped person. As the door space of vehicle or automobile is generally narrow and lower, a nursing person can not easily help and guide a physically handicapped person in climbing onto and descending from the seat.

SUMMARY OF THE INVENTION

In view of the above-stated drawbacks, it is an object of the present invention to provide a seat with a seat climbing/ descending aid structure and a seat climbing/descending aid associated therewith, which are improved in facilitating the ease with which a driver or passenger can climb onto and descend from the seat, and which also maintain a comfortable seating and support touch of the seat.

For that purpose, in accordance with the present invention, there is basically provided a seat provided with a seat climbing/descending aid structure, the seat including a seat cushion of a type having a seating surface inclined backwardly thereof wherein an area of the seating surface on which a driver, passenger or an occupant on the seat places his or her buttocks portion is located at a point below a forward area of the seating surface, characterized in that the seat cushion is formed by: a seat cushion body having a seating surface defined on the upper side thereof; and a pair of bucket-like side support members, each being provided at right and left sides of the seat cushion body in such a manner as to erect therefrom, respectively, wherein the pair of bucket-like side support members have their respective cushion surfaces facing towards the seat cushion body, and the seat cushion body and pair of bucket-like side support members are provided separately from each other, wherein one of the two bucket-like side support members, which is located at a side through which the driver, passenger or occupant on the seat will move his or her buttocks portion when climbing onto and descending from the seat, is formed as a movable side support member, wherein such movable side support member is rotatable toward a horizontal use position where the cushion surface thereof is turned upward on a generally horizontal plane and may be retained there, so as to function as a seat climbing/descending aid for allowing the driver, passenger or occupant on the seat to easily climb onto and descend from the seat, and also characterized in that a backward portion of the seat cushion body has a support point in the seat, while a forward end portion of the seat cushion body is so rotatable about that support point as to be lowered, with such an arrangement that a predetermined operation causes said forward end portion of the seat cushion body to be lowered, whereby the seating surface of seat cushion may be set on a generally same horizontal plane with and generally in registry with the cushion surface of movable side support member which is set in the horizontal use position.

Accordingly, the driver or passenger can easily move his or her buttocks portion on the seat cushion when climbing onto and descending from the seat, which insures to avoid deformation of natural bowed posture for smooth climbing onto and descending from the seat without much resort to his or her strength of arms, thus allowing a physically handicapped or aged person to do so with much ease.

Other features and advantages of the present invention will become apparent from reading of the description hereinafter with reference to the annexed drawings.

DETAILED DESCRIPTION OF PREFERRED EMBODIMENT OF THE INVENTION

Figure 2:
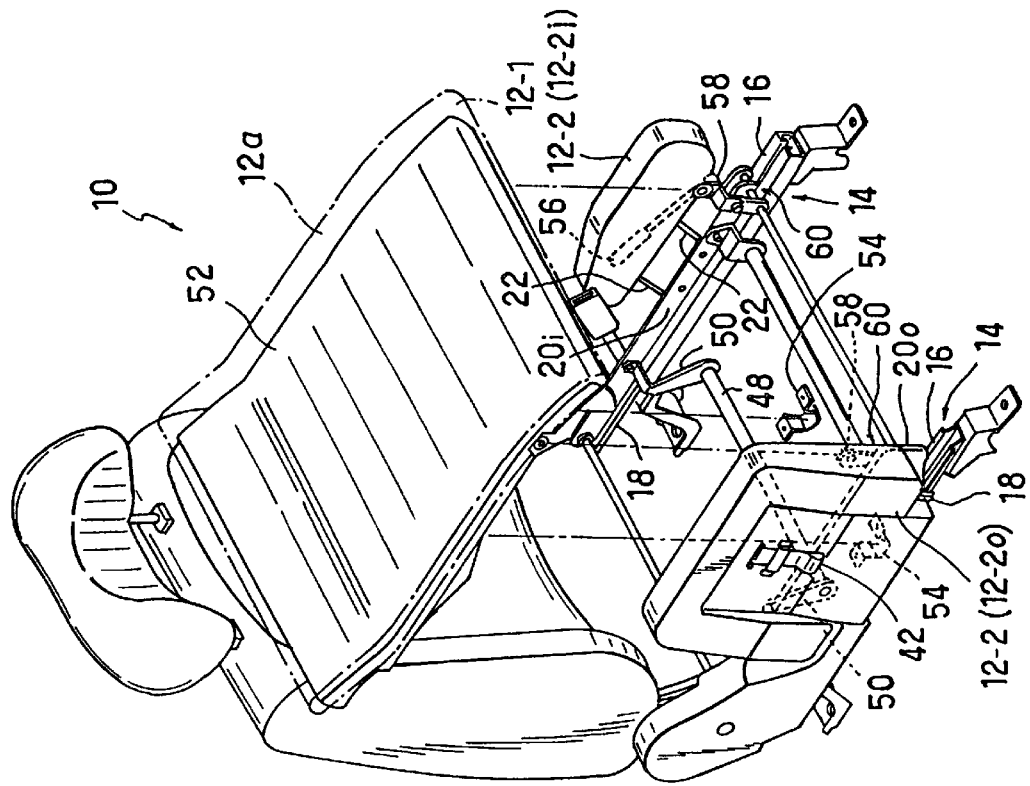
FIG. 2 is a partly exploded schematic perspective view of the seat provided with seat climbing/descending aid structure.
Figure 1:
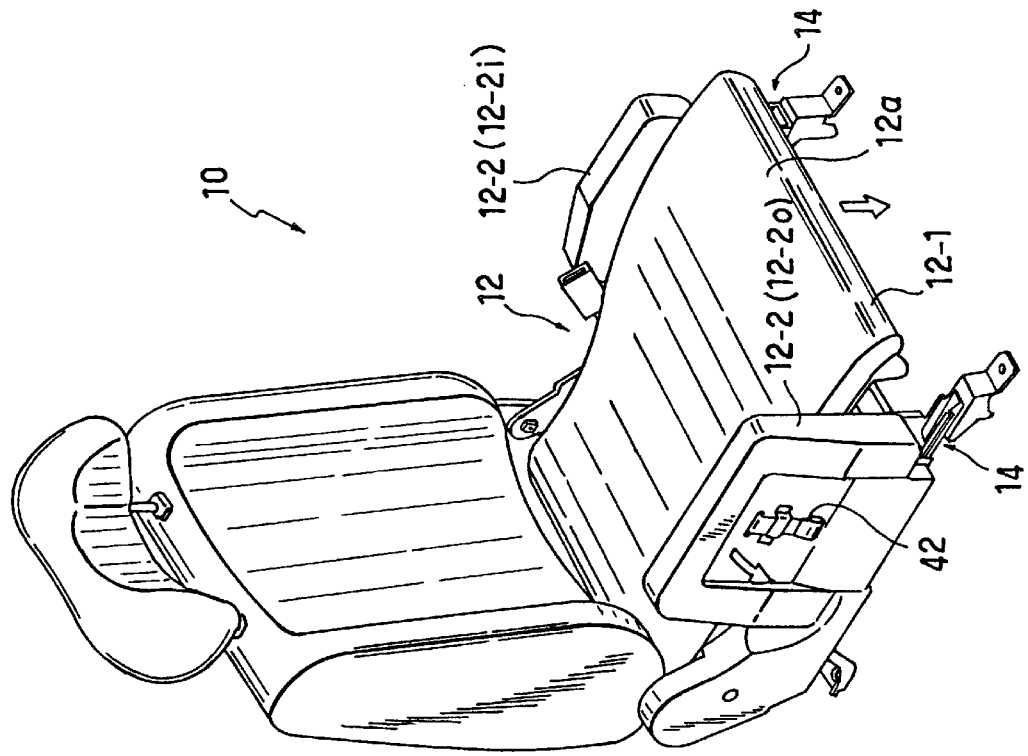
FIG. 1 is a schematic perspective view of a seat provided with a seat climbing/descending aid structure in accordance with the present invention, which shows an initial state thereof as a bucket seat.
Figure 3:
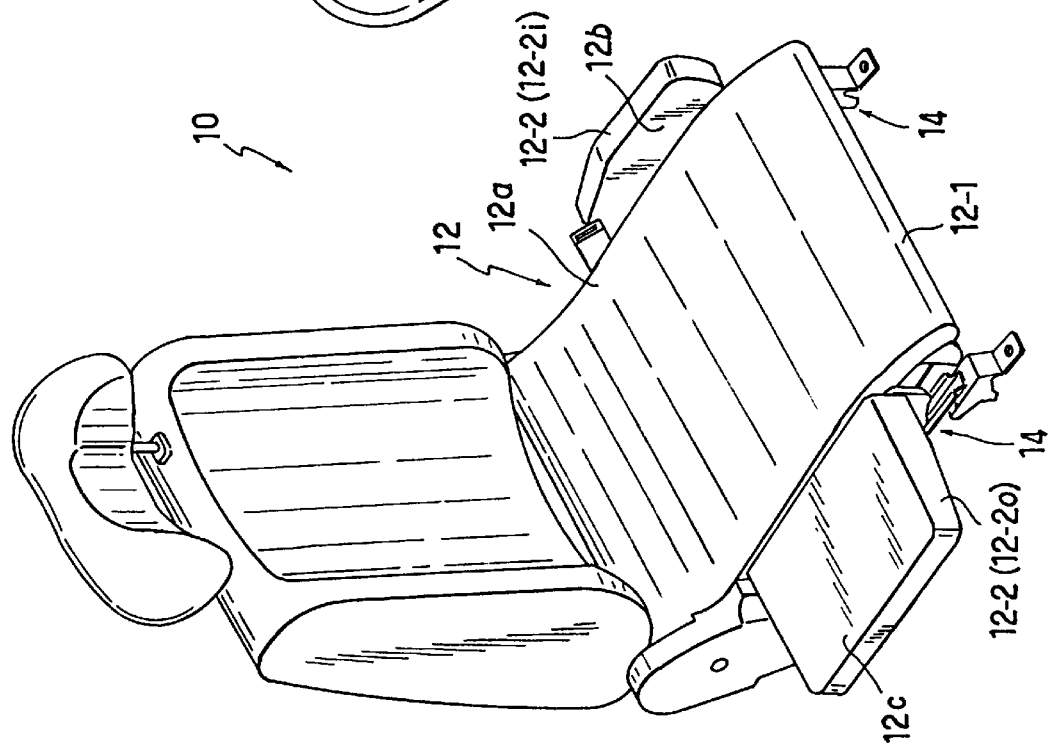
FIG. 3 is is a schematic perspective view of the seat provided with seat climbing/descending aid structure, which shows the state presenting the seat climbing/descending aid for allowing a driver or passenger to easily climb onto and descend from the seat.

As illustrated in FIGS. 1 and 2, a seat provided with a seat climbing/descending aid structure, as generally designated by (10), in accordance with the present invention is formed with a seat cushion (12) of the backwardly inclined type. The seat cushion (12) comprises a seat cushion body (12-1) having a seating surface (12a) which is inclined or lowered backwardly thereof and a pair of spaced-apart bucket-like side support members (12-2)(12-2). The seat cushion body (12-1) and side support members (12-2) are provided separately and independently of each other. The two side support members (12-2) are shown as being divided into a movable side support member (12-2o) and a stationary side support members (12-2i). Although not shown clearly, the movable side support member (12-2o) is situated at the side of door space or at the outer side of a vehicle or automobile body, through which a driver or passenger has to move his or her buttocks portion in order to climb onto or descend from the seat. This movable side support member (12-2o) may be rotated between an upstanding non-use position as seen in FIG. 1 to serve as a bucket-like support area of seat cushion (12) and a horizontal use position which serves as a seat climbing/descending position as can be seen in FIG. 3, forming a seat climbing/descending aid. The detailed description thereon will be made later.

In the illustrated embodiment, while not shown, it should be first understood that the right and left sides are defined relative to the seat (10), as typically viewed from its front in FIG. 1 for instance, and that a door-space side (outer side) of vehicle body is defined on the left side of the seat (10), whereas an inner side of vehicle body is defined on the right side of seat (10). That is, as can be seen from FIGS. 1 and 3, and as viewed from the front of the seat (10), the bucket-like stationary side support member (12-2i) is located on the right side of seat (10), whereas the bucket-like movable side support member (12-2o) is located on the left side of seat (10).

Figure 4:
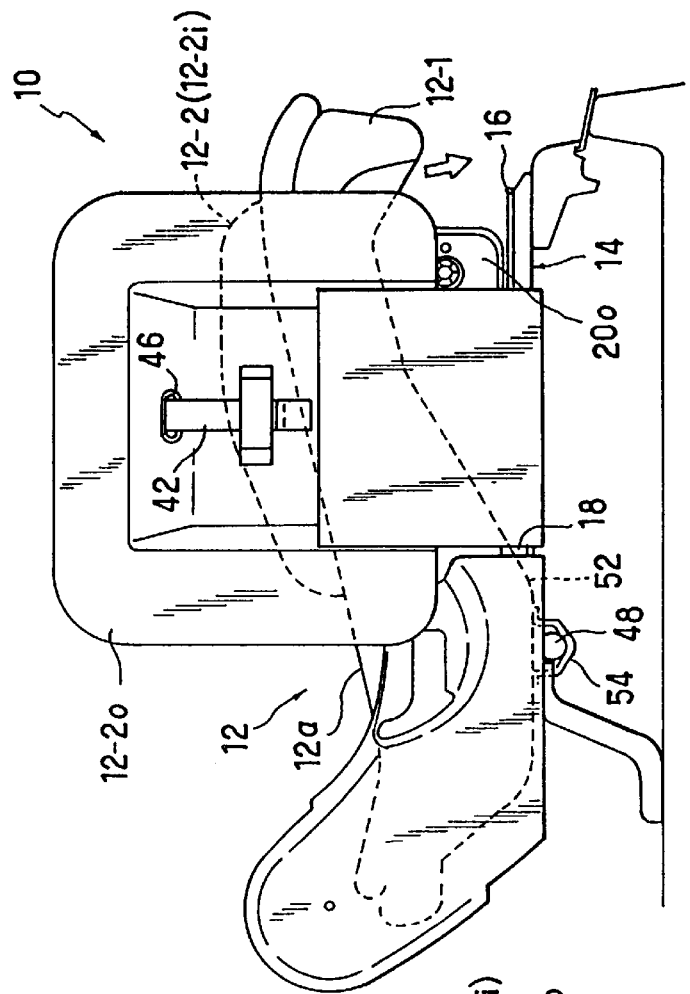
FIG. 4 is a schematic side elevation view of the seat provided with seat climbing/descending aid structure, which shows the initial state thereof as a bucket seat.

As can be seen from in FIG. 4 in conjunction with FIG. 2, the seat (10) is provided with a seat slide device (14). The seat slide device (14) comprises a pair of stationary rail members (16) and a pair slidable rail members (18) slidably fitted in the stationary rail member (16). The stationary rail members (16) are to be fixed on the floor of vehicle or automobile (not shown), while the slidable rail member (18) are shown to be fixed at the seat cushion (12). Both stationary and slidable rail members (16)(18) are spaced apart from each other on the right and left sides of seat (10) which respectively correspond to the outer and inner sides of vehicle. A suitable known seat slide device of this kind may be the one disclosed in the Japanese Laid-Open Patent Pub. No. 5-220025, for example, which can be applied to the seat (10) of the present invention without any modification of its structure. But, this is not the gist of the present invention, and any further detailed explanation thereon is deleted.

The seat cushion (12) is formed in the shown configuration by connecting the seat cushion body (12-1) with and between a pair of spaced-apart first and second base plates (20o)(20i) and by connecting the two bucket-like side support members (12-2) (i.e. the movable side support member (12-2o) and stationary side support member (12-2i)) to those two base plates, respectively.

As shown in FIGS. 2 and 3, the stationary side support member (12-2i) is fixedly connected, via a pair of forward and backward support rods (22)(22), to the second base plate (20i). This side support member (12-2i) erects from the two support rods (22) perpendicularly with respect to the plane of seat cushion body (12-1), facing its inward cushion wall (12b) toward the seat cushion body (12-1).

Figure 6:
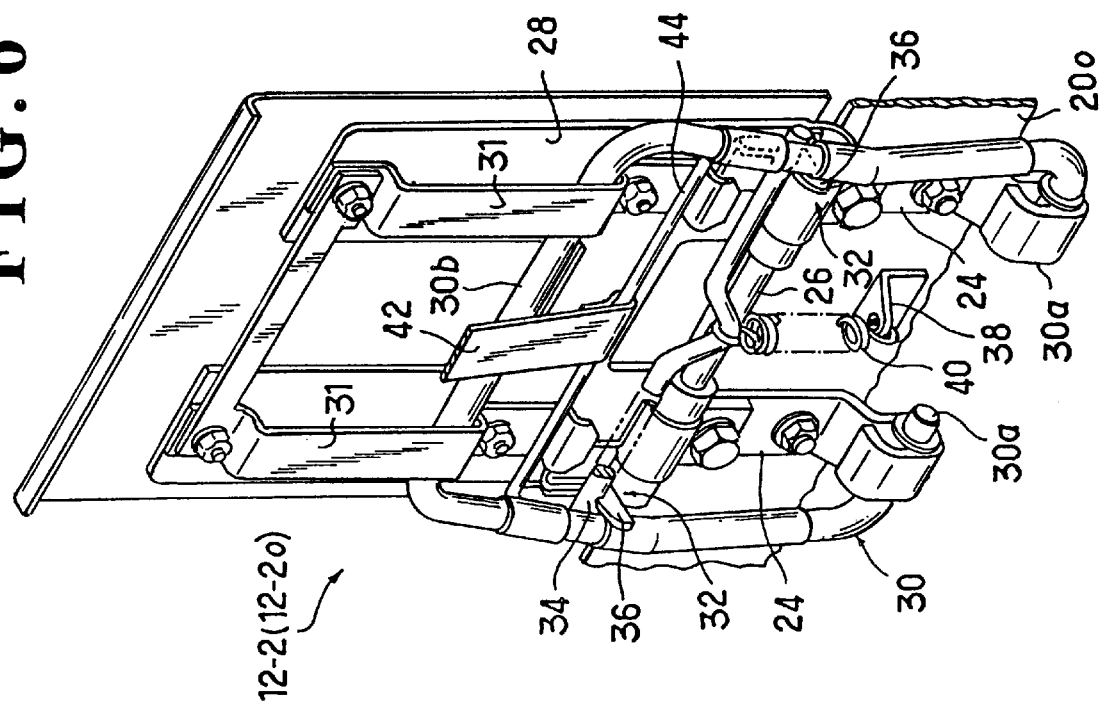
FIG. 6 is a partly broken schematic perspective view which illustrates an inner mechanical structure of the movable side support member.
Figure 5:
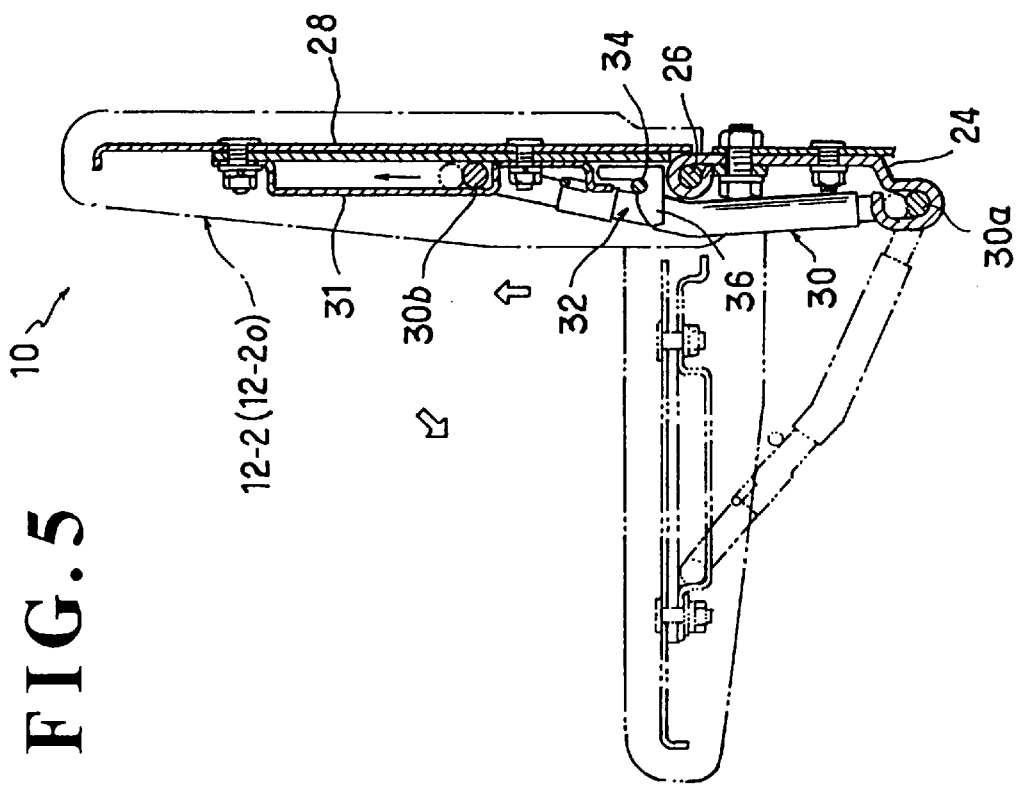
FIG. 5 is a schematic longitudinal sectional view of a movable side support member in the seat provided with seat climbing/descending aid structure.

As shown in FIGS. 5 and 6, in accordance with the present invention, the movable side support member (12-2o) has, provided integrally therewith, a pair of connecting brackets (24)(24) as a base member. Thus, both of the side support member (12-2o) and brackets (24) constitute one unit, and the former (12-2o) is fixed connected via the base; i.e. two connecting brackets (24), to the first base plate (20o) which is situated on the outer side of vehicle (i.e. a side at which a driver or passenger will climb onto and descend from the seat (10)). The movable side support member (12-2o) has a cushion surface (12c) of a generally flat plane, and may be so constructed as to be rotatable between the upstanding non-use position (as seen in FIG. 1) and the horizontal use position (as seen in FIG. 3), as will be explained in detail later. In brief, at the upstanding non-use position, the support member (12-2o) is placed in the state where it erects perpendicularly with respect to the plane of seat cushion (12), while on the other hand, at the horizontal use position, the support member (12-2o) is rotated to a position where it extends horizontally from the seat cushion (12).

The movable side support member (12-2o) includes: a base frame (28) connected rotatably via a support shaft (26) to the upper end of the connecting bracket (24); and a link arm (30) having two lower ends (30a) rotatably connected to and embraced by the connecting bracket (24). The upper end (30b) of the link arm (30) is slidably connected via a guide plate (31) to the base frame (28), to thereby allow rotation of the movable side support member (12-2o) between the upstanding non-use position and horizontal use position.

With this arrangement, rotation of the base frame (28) about the shaft (26) causes simultaneous rotation of the link arm (30) about a longitudinal axis of its two lower ends (30a), which in turn causes the upper end (30b) of link arm (30) to slide along and between the guide plate (31) and base frame (28). This provides a range within which the base frame (28) can be rotated in relation to the connecting bracket (24). Namely, such rotation range of base frame (28) defines a range within which the movable side support member (12-2o) can be rotated with respect to the seat cushion body (12-1) between the upstanding non-use position shown by the solid line and the horizontal use position shown by the two-dot chain line, in FIG. 5.

It is noted here that, in the present embodiment shown in FIGS. 5 and 6, the lower ends (30a) of link arm (30) are so slidably connected to and embraced by the connecting bracket (24) as to be movable in the upward and downward directions with respect to that bracket (24). (see the solid line and two-dot chain line in FIG. 5).

Designation (32) represents a lock means generally, which is operable to act on the link arm (30) upwardly so as to unlock the movable side support member (12-2o) from the upstanding non-use position. Such lock means may be comprised of: a lock bar (34) extended and fixed between two lateral arm sections of the link arm (30); and a pair of hook pieces (36) which can be inserted in and engaged over the lock bar (34). The lock bar (34) includes a tension coil spring (40) extended between the lock bar (34) itself and a lug (38) formed at the base plate (20o), and is thereby provided with a biasing force that biases the lock bar (34) in the direction for engagement with the hook pieces (36).

As shown in FIG. 6, there is provided a lock-off belt (42) having one end connected to a connecting wire (44) extended and fixed between the two lateral arm sections of the link arm (30) and having another end which extends via a predetermined through-hole (46) to project exteriorly of the movable side support member (12-2o). Such another end of lock-off belt (42) is exposed outwardly and retained at the through-hole (46).

Figure 7:
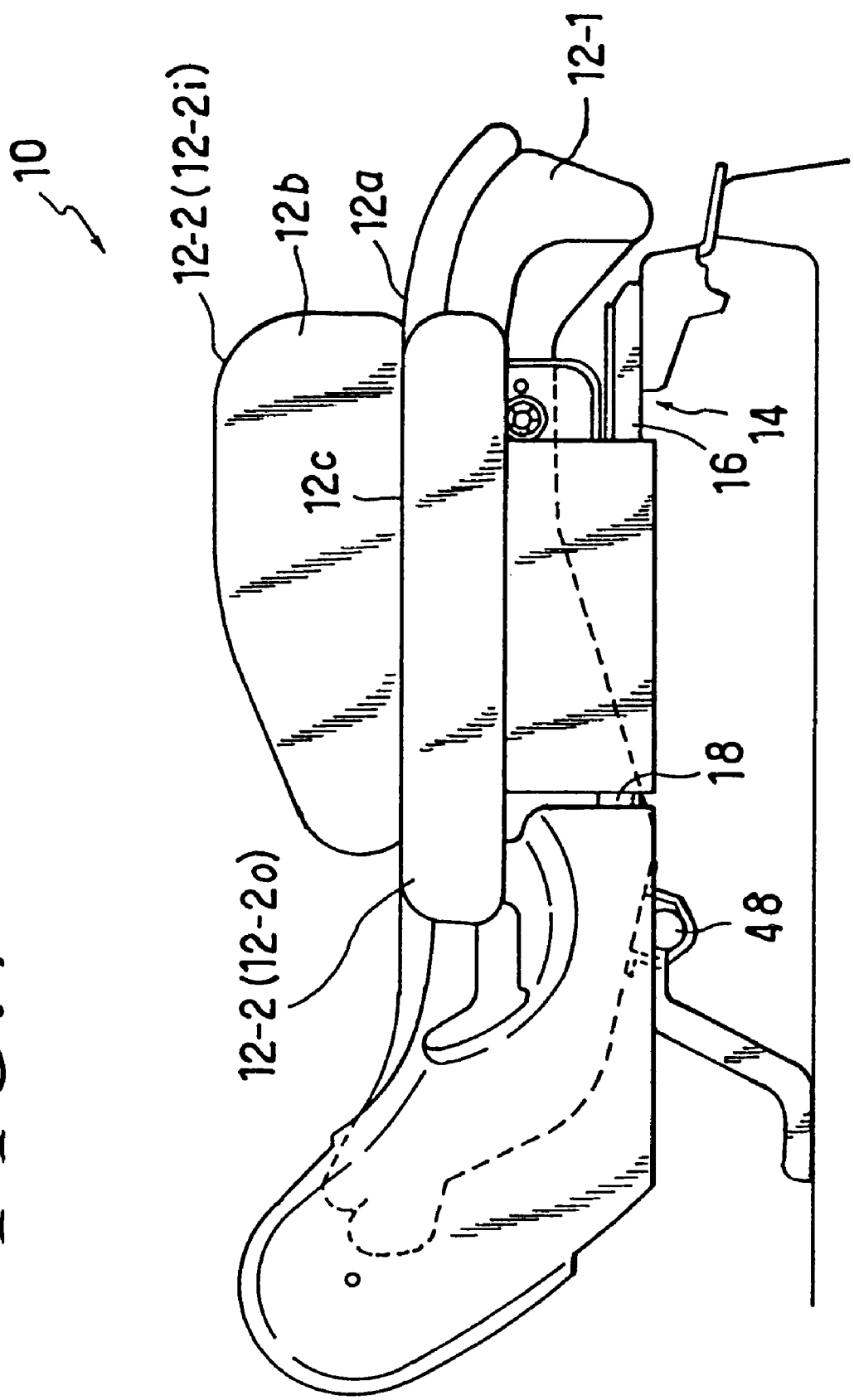
FIG. 7 is a schematic side elevation view of the seat provided with seat climbing/descending aid structure. which shows the state presenting the seat climbing/descending aid for allowing a driver or passenger to easily climb onto and descend from the seat.

As shown in FIGS. 1 and 4, the seat cushion (12) of the seat (10) is of a backwardly inclined or lowered type having a lowered or inclined area in the backward part thereof. That is, the seat cushion body (12-1) having an upper seating surface (12a) is arranged therein in a backwardly inclined state. In accordance with the present invention, the seat cushion (12) per se is rotatably connected to and supported by the two base plates (20o)(20i), such that the forward end portion of seat cushion (12) may be rotatively lowered so as to place the seating surface of seat cushion (12) generally in a horizontal position as shown in FIGS. 3 and 7.

As shown in FIGS. 2 and 4, a support shaft (48) are extended via brackets (50) between the backward end sections of two base plates (20o)(20i). The backward portion of a seat cushion frame (52) associated with the seat cushion body (12-1) is rotatably connected via embracing brackets (54) to the support shaft (48). The forward portion of seat cushion body (12-1) is supported by an elevation means (60) in such a manner as to allow it to be raised and lowered in the upward and downward directions by operation of a control lever (56). The elevation means (60) may comprise two link arms (58) and the control lever (56), the former (56) being rotatable vertically in response to the operation of the latter (56). This elevation means (60) may be of any suitable construction that permits the link arms (58) to be rotated through operation of the control lever (56) so as to raise and lower the forward end portion of seat cushion body (12-1) at a given position where the forward portion of seat cushion body (12-1) is placed generally at a horizontal position.

Thus, it is not the gist of the present invention, and any further detailed explanation thereon is deleted.

As shown in FIGS. 1 and 4, supposed that an initial state of the seat (10) is such a state where the movable side support member (12-2o) is placed in the upstanding non-use position and the seat cushion body (12-1) is placed in a backwardly inclined state, with its seating surface (12a) inclined backwardly thereof. Under this initial state of seat (10), when a driver or passenger wishes to descend from the seat (10), he or she should pull the lock-off belt (i.e. unlocking member)(42) so as to raise the link arm (30) against the biasing force of the locking spring (40), to thereby disengage the lock bar (34) of the foregoing lock means from the hook piece (36). (see FIGS. 5 and 6) Then, with this unlocked state of the lock means (32), the driver or passenger should rotate the movable side support member (12-2o) in the outward direction of seat (10), and place the same in the horizontal use position at generally the same level with a horizontal plane which is the plane of seating surface (12c) of seat cushion (12). (see the two-dot chain line in FIG. 5)

Next, the driver or passenger should rotate the control lever (56) forwardly to cause lowering of the forward end portion of seat cushion body (12-1), so that the seat cushion body (12-1) is rotated to a position where its seating surface (12a) is placed generally in the horizontal plane, and retained there.

FIGS. 3 and 7 show the state where the movable side support member (12-2o) is set in the horizontal use position and the forward end portion of seat cushion body (12-1) is set in such a position where the forward end portion of seat cushion body (12-1) is lowered as stated above. Under this state, it is appreciated that the cushion surface (12c) of movable side support member (12) is set generally at the same horizontal plane with and generally in registry with the seating surface (12a) of seat cushion body (12-1), which establishes a seat climbing/descending aid condition in the seat (10).

Under such seat climbing/descending aid condition in the seat (10), the driver or passenger has only to move his or her buttocks portion on and along a continuous horizontal plane established by the seat cushion body seating surface (12a) and movable side support member cushion surface (12c), and therefore, can easily move the buttocks portion, when wishing to get off the vehicle. Further, the driver or passenger can easily place his or her her buttocks portion on the thus-horizontally-extended cushion surface (12c) of movable side support member (12), thereby permitting easy displacement of his or her leg and foot portions therefrom towards the door space and outside of a vehicle or automobile. Hence, the driver or passenger can easily take a natural bowed seating posture in all the processes of displacing his or her lower part of body laterally along the seating surface of seat (10) and descending from the seat (10), so that he or she can smoothly stand up from the movable side support member (12) to readily get off the vehicle. Accordingly, this effectively allows a physically handicapped or aged person to easily descend from the seat without changing his or her seating posture and without resort to his or her strength of arms. Also, in the case of such a disable person having a defective lower half of body, it is easy for him or her to displace his or her buttocks portion on and along the continuous horizontal plane defined by both seat cushion body seating surface (12a) and movable side support member cushion surface (12c), using his or her ordinary strength of arms. Thus, when such disable person places his or her buttocks and leg portions upon the movable side support member (12-2o), he or she can orients his or her body towards the door space, projecting his or her legs out of the vehicle. This will provide an enough space adjacent to the door space of vehicle, where a nursing person can work to help and guide the disable person to descend from the seat, and thus allows the nursing person to smoothly and easily act to let the disable person get off the vehicle.

When the occupant on the seat (10) completely gets off the vehicle (or have descended from the seat (10)), he or she (or a nursing person) has only to rotate the movable side support member (12-2o) upwardly from the horizontal use position to the upstanding non-use position, whereby the lock means (32) effects locking action to retain the movable side support member at the upstanding non-use position. At this moment, it is noted that the seat cushion body (12) is still placed in the generally horizontal position where its forward end portion is lowered, thus remaining its seating surface (12a) generally in the horizontal plane, because there is no interlocking relation between the seat cushion body (12-1) and movable side support member (12-2o).

Then, after such seat descending action, if the driver or passenger (or physically handicapped person) wishes to again get on the vehicle or climb onto the seat (10), he or she has only to rotate the movable side support member (12-2o) from the upstanding non-use position toward the horizontal use position, whereupon a generally continuous horizontal plane is presented by the movable side support member cushion surface (12c) and seat cushion body seating surface (12a). Hence, the driver or passenger can first place his or her buttocks portion on the movable side support member cushion surface (12c), then displace his leg and foot portions to the inside of vehicle, and finally slides his buttocks portion to the seat cushion body seating surface (12a). Thereafter, the driver or passenger should rotate the movable side support member (12-2o) to the upstanding non-use position, and rotate the control lever (56) in the backward direction so as to cause raising of the forward end portion of seat cushion body (12-1), thereby rotating and setting the seat cushion body (12-1) to the backwardly inclined state. In that way, both movable side support member (12-2o) and seat cushion body (12-1) are returned to the initial position shown in FIGS. 1 and 4 (see the solid line in FIG. 5 as well).

As described above, in accordance with the seat (1) provided seat climbing/descending aid structure of the present invention, it is appreciated that the movable side support member (12-2o) can be rotated to and set in the horizontal use position where its cushion surface (12c) is placed generally at a horizontal plane, while the forward end portion of seat cushion body (12-1) can be so lowered as to place the seating surface (12c) of seat cushion body (12-1) generally on the same horizontal plane with and generally in registry with the movable side support member cushion surface (12c), which establishes a seat climbing/descending aid condition in the seat (10). Accordingly, under such seat climbing/descending aid condition, the driver or passenger, when wishing to climb onto or descend from the seat (10), can easily move his or her buttocks portion to or from the seat cushion (12) without lifting so high his or her buttocks or thigh portions therefrom. Also, at this process, the driver or passenger has only to place his or her buttocks portion on the cushion surface (12c) movable side support member (12-2o) set in the horizontal use position, and then can smoothly climb onto or descend from the seat (10), which insures to avoid deformation of posture in getting on and off the vehicle and also avoid a problem or trouble in using the strength of arms. This permits a physically handicapped or aged person to easily climb onto and descend from the seat (1) in order to get on and off the vehicle or automobile.

As stated above, the seat cushion body (12) can be controlled to set its seating surface (12a) in the backwardly inclined state, while the movable side support member (12-2o) can be set in the upstanding non-use position, thus cooperating with another stationary side support member (12-2i) to provide a bucket seat as a whole, which insures a positive support to an occupant sitting on the seat under a normal sitting condition. Namely, in accordance with the seat (10) of the present invention, there is provided an effective seat climbing/descending aid structure wherein a physically handicapped or age person can not only attain a positive support in sitting on the seat, but also attain an easy climbing and descending onto and from the seat.

Further, in accordance with the present invention, the forward end portion of seat cushion body (12-1) can be lowered to set its seating surface (21a) generally on the horizontal plane, thereby permitting for lowering of seating level of the seat in that horizontal state. This is effective for use in a vehicle or automobile having a high area on which the seat (10) is mounted, such as one-box car or RV car.

Furthermore, the movable side support member (12-2o) has the link arm (30) having the upper end (30b) embraced by the guide plate (31). Hence, the guide plate (31) limits the sliding range of the link arm upper end (30b) therewithin to thereby limit the rotation range of the base frame (28) relative to the connecting bracket (24) (i.e. the rotation range of the movable side support member (12-2o) relative to that bracket (24)). The movable side support member (12-2o) is therefore supported by the link arm (30), whereby a load, or a weight of occupant on the seat, applied to the cushion surface (12c) of movable side support member (12-2o) set in the horizontal use position will be escaped to the link arm (30) (see the two-dot chain line in FIG. 5). Accordingly, a support force to the movable side support member (12-2o) can be increased enough without requiring a complicated construction of this particular portion.

Moreover, in the present invention, the seat climbing/descending aid is embodied by the foregoing movable side support member (12-2o), and this particular movable side support member is provided as one unit in the seat (10), which can be easily attached to the seat (10). In addition, the movable side support member (12-2o), an aid for seat climbing/descending purpose, can be used as one single unit and therefore applied to another seat of different kind of vehicle or automobile. For instance, the movable side support member (12-2o) may be applied to an emergency seat of sub seat or an auxiliary seat in a mini-van-type automobile.

In the present invention, the lock means (32) is embodied by such structure wherein an unlocking action is effected by the upward and downward movement of the link arm (30). But, the lock means (32) is not limited thereto and may be of any other structure suited for locking and unlocking in the present invention. In this respect, the lock means (32) is not limited to the above-described locking structure for locking action only when the movable side support member is set in the upstanding non-use position, but may be of such locking structure capable of locking action, no matter of whether the movable side support member is set in the upstanding non-use position or set in the horizontal use position.

In the present invention, the seat climbing/descending aid structure in the seat (10) provided with seat climbing/descending aid structure is embodied by the movable side support member (12-2o) and the seat cushon body (12-1) whose forward end portion can be lowered. This is suited not only for a physically handicapped or aged person, but also for an ordinary person of good physical condition. Thus, any person can enjoy the advantages of this seat climbing/descending aid structure; namely, all that any person has to do first is only to place his or her buttocks portion on the movable side support member cushion surface (12c), and thereafter, he or she can move his or her leg and foot portions as it is to the inside of vehicle, without widening his or her two legs away from each other. This is particularly suited for the case where a woman or lady with a skirt and delicate cloths has to climb onto or descend from the seat.

The seat (10) is not limited to a seat for automobile, but may be applied to a seat for use in such a vehicle as a train, ship or airplane, and also to various kinds of seat for use in an amusement facilities. It should be understood that the present invention is not limited to the illustrated embodiments, but any other modifications, replacements and additions may be structurally applied thereto without departing from the scopes of the appended claims.

What is claimed is:

1. A seat provided with a seat climbing/descending aid structure, the seat including a seat cushion of a type having a seating surface inclined backwardly thereof wherein an area of the seating surface on which a driver, passenger or an occupant on the seat will place his or her buttocks portion is located at a point below a forward area of the seating surface, characterized in that said seat cushion is formed by: a seat cushion body having a seating surface defined on the upper side thereof; and a pair of bucket-like side support members, each being provided at right and left sides of said seat cushion body in such a manner as to erect therefrom, respectively, wherein said pair of bucket-like side support members have their respective cushion surfaces facing towards said seat cushion body, and said seat cushion body and pair of bucket-like side support members are provided separately from each other, wherein one of said pair of bucket-like side support members, which is located at a side through which the driver, passenger or occupant on the seat will move his or her buttocks portion when climbing onto and descending from the seat, is formed as a movable side support member, wherein said movable side support member is rotatable toward a horizontal use position where the cushion surface thereof is turned upward on a generally horizontal plane and may be retained there, so as to function as a seat climbing/descending aid for allowing the driver, passenger or occupant on the seat to easily climb onto and descend from the seat, and also characterized in that a backward portion of said seat cushion body has a support point in the seat, while a forward end portion of the seat cushion body is rotatable about said support point so as to be lowered, with such an arrangement that a predetermined operation causes said forward end portion of the seat cushion body to be lowered, whereby the seating surface of said seat cushion may be set on a generally same horizontal plane with and generally in registry with the cushion surface of said movable side support member which is set in said horizontal use position.

2. A seat provided with a seat climbing/descending aid structure, the seat including a seat cushion of a type having a seating surface inclined backwardly thereof wherein an area of the seating surface on which a driver, passenger or an occupant on the seat will place his or her buttocks portion is located at a point below a forward area of the seating surface, characterized in that:

said seat cushion is comprised of: a seat cushion body having a seating surface defined on the upper side thereof; and a pair of bucket-like side support members, each being provided at right and left sides of said seat cushion body in such a manner as to erect therefrom, respectively, wherein said pair of bucket-like side support members have their respective cushion surfaces facing towards said seat cushion body, and said seat cushion body and pair of bucket-like side support members are provided separately from each other;

wherein one of said pair of bucket-like side support members, which is located at a side through which the driver, passenger or occupant on the seat will move his or her buttocks portion when climbing onto and descending from the seat, is formed as a movable side support member, said movable side support member including:

a mechanism portion arranged such that a connecting bracket is fixed to a predetermined fixing member, and that a base frame is rotatably connected, at the lower end thereof, with an upper part of said connecting bracket, while a link arm is rotatably connected, at the lower end thereof, with a lower part of said connecting bracket, with an upper end of said link arm being slidably connected with said base frame; and a lock means including a hook and a lock bar, wherein said lock bar is biased under a predetermined biasing force in a direction for engagement with said hook, to thereby allowing for limiting rotation of said base frame at a predetermined position, whereby said movable side support member is rotatable toward a horizontal use position where the cushion surface thereof is turned upward on a generally horizontal plane and may be retained there, so as to function as a seat climbing/descending aid for allowing the driver, passenger or occupant on the seat to easily climb onto and descend from the seat;

and also characterized in that a backward portion of said seat cushion body has a support point in the seat, while a forward end portion of the seat cushion body is rotatable about said support point so as to be lowered, with such an arrangement that a predetermined operation causes said forward end portion of the seat cushion body to be lowered, whereby the seating surface of said seat cushion may be set on a generally same horizontal plane with and generally in registry with the cushion surface of said movable side support member which is set in said horizontal use position.

3. The seat provided with seat climbing/descending aid structure according to claim 2, wherein the lower end of said link arm is slidably connected with and embraced by the lower end of said connecting bracket so as to be movable in upward and downward directions with respect thereto, and wherein pulling said link arm upwardly against said biasing force with respect to said connecting arm causes unlocking action of said lock means.

4. The seat provided with seat climbing/descending aid structure according to claim 2, wherein there is provided a guide plate which limits a range within which the upper end of said link arm is slid, to thereby limit a range within which said movable side support member is rotatable between said horizontal use position and an upstanding non-use position where the movable side support member erects from the seat cushion body.

5. A seat climbing/descending aid provided in a seat, which allows a driver, passenger or an occupant on the seat to easily climb onto and descend from the seat, said seat climbing/descending aid being provided as one unit for attachment to the seat in such a manner as to have a cushion surface defined at one flat side thereof and comprising:

a mechanism portion arranged such that a connecting bracket is fixed to a predetermined fixing member, and that a base frame is rotatably connected, at the lower end thereof, with an upper part of said connecting bracket, while a link arm is rotatably connected, at the lower end thereof, with a lower part of said connecting bracket, with an upper end of said link arm being slidably connected with said base frame; and a lock means including a hook and a lock bar, wherein said lock bar is biased under a predetermined biasing force in a direction for engagement with said hook, to thereby allowing for limiting rotation of said base frame at a predetermined position, wherein said seat climbing/descending aid is rotatable, via said mechanism portion, between an upstanding non-use position where the seat climbing/descending aid erects from the seat, with the cushion surface thereof being generally perpendicular with respect to the seat and a horizontal use position where the seat climbing/descending aid is placed in such a manner as to extend the cushion surface on a generally horizontal plane, and wherein the seat climbing/descending aid may be retained by said lock means in one of said upstanding non-use and horizontal use positions.

6. The seat climbing/descending aid according to claim 5, wherein the lower end of said link arm is slidably connected with and embraced by the lower end of said connecting bracket so as to be movable in upward and downward directions with respect thereto, and wherein pulling said link arm upwardly against said biasing force with respect to said connecting arm causes unlocking action of said lock means.

7. The seat climbing/descending aid according to claim 5, wherein there is provided a guide plate which limits a range within which the upper end of said link arm is slid, to thereby limit a range within which the seat climbing/descending aid is rotatable between said upstanding non-use position and and horizontal use position.

\* \* \* \* \*